US010795357B2

(12) United States Patent
Feng et al.

(10) Patent No.: US 10,795,357 B2
(45) Date of Patent: Oct. 6, 2020

(54) METHOD AND DEVICE FOR CONTROLLING VEHICLE AND AUTONOMOUS DRIVING VEHICLE

(71) Applicant: Guangzhou Automobile Group Co., Ltd, Guangzhou, Guangdong (CN)

(72) Inventors: Hongwei Feng, Palo Alto, CA (US); Yinguang Li, San Jose, CA (US); Chen Zhang, San Jose, CA (US); Weizhe Zhang, Fremont, CA (US)

(73) Assignee: GUANGZHOU AUTOMOBILE GROUP CO., LTD, Guangzhou (CN)

( * ) Notice: Subject to any disclaimer, the term of this patent is extended or adjusted under 35 U.S.C. 154(b) by 140 days.

(21) Appl. No.: 16/131,056

(22) Filed: Sep. 14, 2018

(65) Prior Publication Data

US 2020/0089223 A1 Mar. 19, 2020

(51) Int. Cl.
*B60W 40/068* (2012.01)
*G05D 1/00* (2006.01)
*G05D 1/02* (2020.01)

(52) U.S. Cl.
CPC ......... *G05D 1/0061* (2013.01); *B60W 40/068* (2013.01); *G05D 1/0214* (2013.01)

(58) Field of Classification Search
CPC ......... B60W 2552/40; B60W 2555/20; B60W 40/068
See application file for complete search history.

(56) References Cited

U.S. PATENT DOCUMENTS

| 9,816,827 | B1 | 11/2017 | Slusar | |
|---|---|---|---|---|
| 2019/0051172 | A1* | 2/2019 | Stenneth | G08G 1/096775 |
| 2019/0294167 | A1* | 9/2019 | Kutila | B60W 30/0956 |
| 2020/0064839 | A1* | 2/2020 | Oyama | G05D 1/0061 |

* cited by examiner

*Primary Examiner* — Kenneth J Malkowski
(74) *Attorney, Agent, or Firm* — Gang Yu

(57) ABSTRACT

A method and device for controlling a vehicle, and an autonomous driving vehicle are provided. The method includes that: historical weather information of a present driving road planned for a vehicle is acquired; a slippery parameter of the present driving road is determined according to the historical weather information; and an autonomous driving mode of the vehicle is controlled according to the slippery parameter.

19 Claims, 4 Drawing Sheets

METHOD AND DEVICE FOR CONTROLLING VEHICLE AND AUTONOMOUS DRIVING VEHICLE

TECHNICAL FIELD

The disclosure relates to the field of computers, in particular to a method and device for controlling an autonomous driving vehicle.

BACKGROUND

When driving a car X with autonomous driving function, the car X can obtain traffic information of the road at present, and control the car X accordingly. If the traffic information indicates that there is no other car on the lane where the car X is, the controlling system in the car X may speed up the car X vehicle. However, if there is waterlogging within the lane, the car X which is speeding up may be in a dangerous state.

At present, an effective solution has not been presented aiming at the above problem.

SUMMARY

The following presents a simplified summary in order to provide a basic understanding of some aspects of the disclosure. This summary is not an extensive overview of the disclosure. It is intended neither to identify key or critical element of the disclosure. The following summary merely presents some concepts of the disclosure in a simplified form as a prelude to the description below.

In accordance with an aspect of the disclosure, a method for controlling a vehicle is provided. Historical weather information of a present driving road planned for the vehicle is acquired; a slippery parameter of the present driving road is determined according to the historical weather information; and the autonomous driving mode of the vehicle is controlled according to the slippery parameter.

In accordance with another aspect of the disclosure, a device for controlling a vehicle is also provided. The device includes: a processor, configured to execute computer executable instructions; a memory, storing the computer executable instructions that, when executed by the processor, cause the device to perform following steps. Historical weather information of the present driving road planned for the vehicle is acquired; the slippery parameter of the present driving road is determined according to the historical weather information; and the autonomous driving mode of the vehicle is controlled according to the slippery parameter.

In accordance with another aspect of the disclosure, an autonomous driving vehicle is also provided. The autonomous driving vehicle includes: a navigation device, configured to plan the present driving road for the vehicle; the processor, configured to execute the computer executable instructions; the memory, storing the computer executable instructions that, when executed by the processor, cause the vehicle to perform following steps. Historical weather information of the present driving road planned for the vehicle is acquired; the slippery parameter of the present driving road is determined according to the historical weather information; and the autonomous driving mode of the vehicle is controlled according to the slippery parameter.

BRIEF DESCRIPTION OF THE DRAWINGS

The accompanying drawings described here are used for providing a deeper understanding of the present invention, and constitute a part of the application; schematic embodiments of the present invention and description thereof are used for illustrating the present invention and not intended to form an improper limit to the present invention. In the accompanying drawings.

DETAILED DESCRIPTION OF THE EMBODIMENTS

In order to make those skilled in the art understand the solutions of the present invention more clearly, the technical solutions in the embodiments of the present invention are clearly and completely elaborated below in combination with the accompanying drawings. It is apparent that the described embodiments are only a part of the embodiments of the present invention but not all. Based on the embodiments of the present invention, all the other embodiments obtained by those of ordinary skill in the art on the premise of not contributing creative effort belong to the scope of protection of the present invention.

It is to be noted that the terms like "first" and "second" in the specification, the claims and the accompanying drawings of the present invention are used for differentiating the similar objects, but do not have to describe a specific order or a sequence. It should be understood that the objects may be exchanged under appropriate circumstances, so that the embodiments of the present invention described here may be implemented in an order different from that described or shown here. Moreover, the terms like "include" and "have" and any variation of them are intended to cover nonexclusive including; for example, the process, method, system, product or device including a series of steps or units do not have to be limited to those clearly listed steps or units, but may include other steps or units which are not clearly listed or inherent in these process, method, system, product or device.

Currently, the self-driving cars are heavily relying on on-going environment perception using sensors such as camera, radar, and ultra-sonic. In addition, HD maps are also commonly used in combine with the sensor information.

Historical data could provide a priori knowledge for the on-going perception, decision making and path planning of self-driving cars. With such information, the system can enhance the environment prediction and detection for the route that it is going to travel; thus historical data makes better decision for safer and smoother driving.

Figure 1:
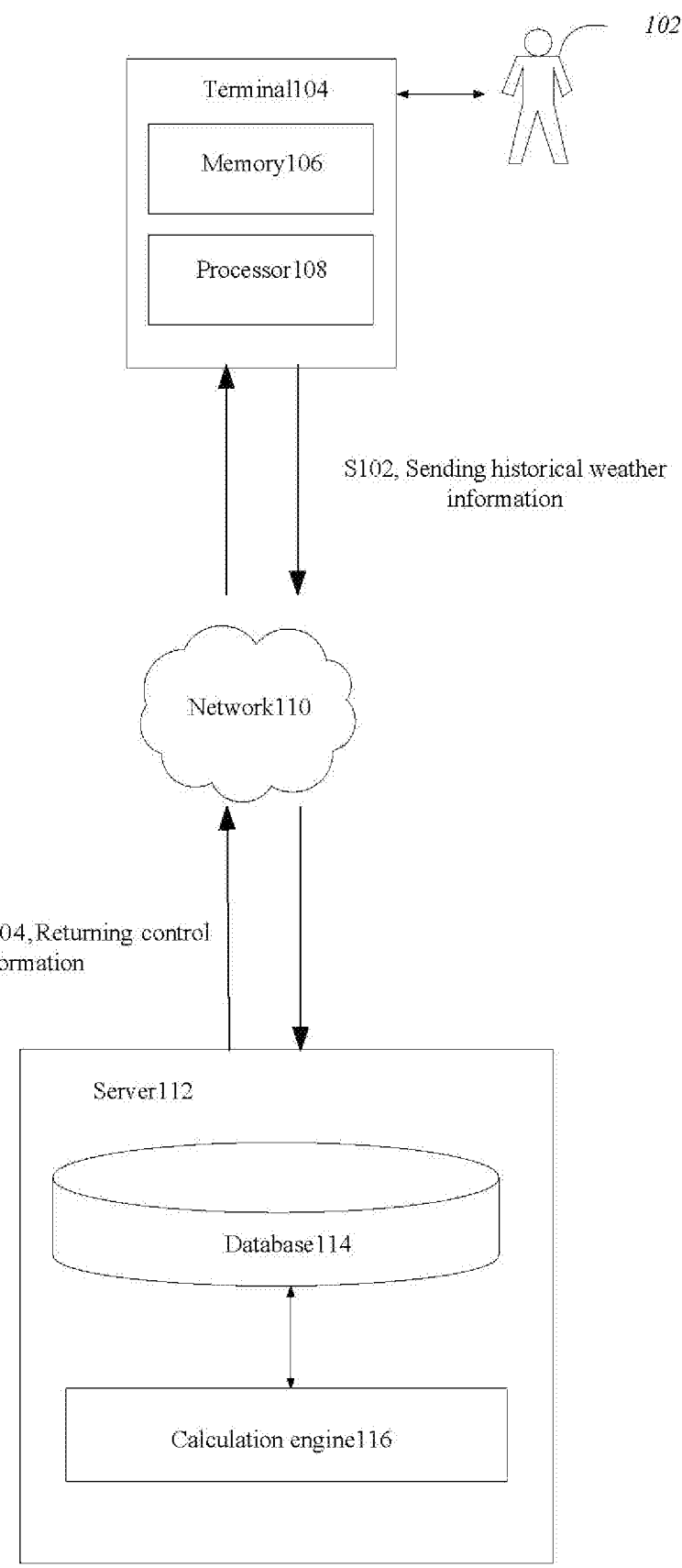
FIG. 1 is a schematic diagram of an application environment of an alternative method for controlling a vehicle in accordance with an aspect of the disclosure.

According to an aspect of the present invention, a method for controlling a vehicle is provided. Alternatively, as an alternative embodiment, the above method for controlling a vehicle may be applied, but not limited, to the environment shown in FIG. 1. A user 102 may perform man-machine interaction with a terminal 104. The terminal 104 includes a memory 106, which is configured to store the acquired historical weather information, a processor 108, which is configured to send via a network 110 the acquired historical weather information to a server 112 through S102. The server 112 includes a database 114, which is configured to store the acquired historical weather information, a calculation engine 116, which is configured to calculate the slippery parameter of the present driving road according to the acquired historical weather information. After the slippery parameter is calculated, the server 112 returns via the network 110 it to the terminal 104 through S104, so that the terminal 104 controls the autonomous driving mode according to the slippery parameter.

Alternatively, the method for controlling a vehicle may be applied, but not limited, to the terminals capable of calculating data, for example, a mobile phone, a tablet PC, a laptop, a personal computer, or a vehicle intelligent terminal and even a car. The above network may include, but not limited to, wireless networks. Herein, the wireless networks include Bluetooth, WIFI and other networks implementing wireless communication. The server may include, but not limited to, any hardware device capable of calculating.

Figure 2:
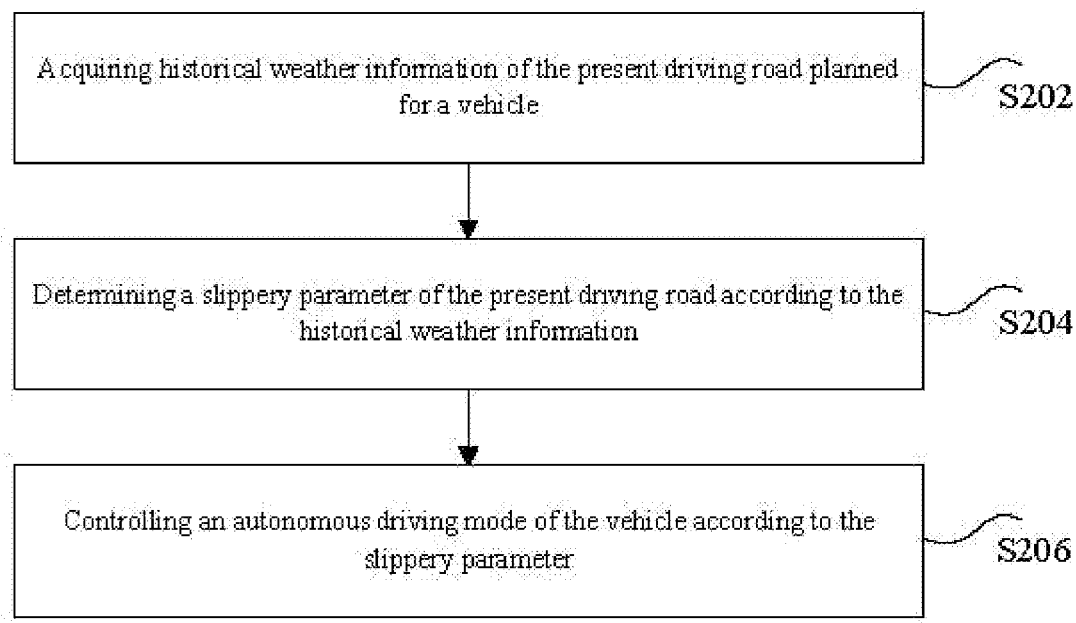
FIG. 2 is a flowchart of an alternative method for controlling a vehicle in accordance with another aspect of the disclosure.

Alternatively, as an alternative embodiment, as shown in FIG. 2, the method for controlling a vehicle includes the following steps.

At S202, the historical weather information of the present driving road planned for the vehicle is acquired.

At S204, the slippery parameter of the present driving road is determined according to the historical weather information.

At S206, the autonomous driving mode of the vehicle is controlled according to the slippery parameter. For example, when the slippery parameter indicates that the present driving road is slippery, then the autonomous driving mode of the vehicle is controlled.

Based on above alternative method, the car with the autonomous driving function can be controlled safely, since the historical weather information of a present driving road is considered. Alternatively, the historical weather information may, but be not limited to, comprise at least one of the followings: a road type of the present driving road, a lane type of the present lane where the vehicle ison, water accumulation volume on the present driving road formed since the last rainfall on the present driving road, and a time interval between the time of the last rainfall on the present driving road and the present time.

Alternatively, the historical weather information may, but not limited to, comprise at least one of the followings: a road type of the present driving road, a lane type of the present lane where the vehicle is on, snow accumulation volume on the present driving road formed since the last snowfall on the present driving road, and the time interval between the time of the last snowfall on the present driving road and the present time.

Alternatively, the water accumulation volume on the present driving road formed since the last rainfall on the present driving road or the snow accumulation volume on the present driving road formed since the last snowfall on the present driving road may be acquired by, but not limited to, a way of machine learning.

Alternatively, the slippery parameter of the present driving road may be calculated through, but not limited to, the above historical weather information; for example, the slippery parameter is calculated by the following formula:

$$D = k_0 * Aw * e^{-k_1 * delta\_t} \quad (1)$$

where D represents the slippery parameter, the $k_0$ is a predetermined constant, and alternatively, may be a preset positive number, the Aw is the water accumulation volume on the present driving road formed since the last rainfall or the water accumulation volume on the present driving road formed since the last snowfall on the present driving road, a value of the $k_1$ is related to the road type of the present driving road and the lane type of the lane, where the vehicle is, of the present driving road, and the delta_t is the time interval between the time of the last rainfall on the present driving road and the present time. Through the above formula, the slippery parameter of the present driving road may be acquired, and the autonomous driving mode is controlled through the slippery parameter.

Alternatively, that the value of the $k_1$ is related to the road type of the present driving road and the lane type of the lane, where the vehicle is, of the present driving road may be implemented by, but not limited to, the following way:

a relationship between the $k_1$ and the road type of the present driving road and the lane type of the lane, where the vehicle is, of the present driving road is preset.

For example, there are two road types of the present driving road, which are respectively road type 1 and road type 2, and there are three lane types of the present driving road, which are respectively a left lane, a middle lane, and a right lane, then the value of the $k_1$ is set according to the road type and the lane type of the present driving road. For example, the $k_1$ of the left lane of the road type 1 is set to 2.5, and the $k_1$ of the right lane of the road type 2 is set to 3.

It is to be noted that there may be multiple road types and multiple lane types, which are not limited in the embodiment. The value of the $k_1$ may be set according to the road type and lane type.

Alternatively, after the above slippery parameter is acquired, it may be, but not limited to being, normalized to be converted into a number between 0 and 10. The greater the number is, the present driving road is more slippery.

For example, a mapping table between the slippery parameter and a slippery degree of the present driving road may be preset. Different values of the slippery parameter correspond to the same or different slippery degrees. For example, when the slippery parameter is 0, the present driving road is not slippery; when the slippery parameter is greater than 0 and less than or equal to 4, the present driving road is mildly slippery (the third greatest slippery degree); when the slippery parameter is greater than 4 and less than or equal to 7, the present driving road is moderately slippery (the second greatest slippery degree); when the slippery parameter is greater than 7 and less than or equal to 10, the present driving road is severely slippery (the greatest slippery degree).

It is to be noted that the mapping table between the slippery parameter and the slippery degree of the present driving road is only an alternative way, and specific classification of data and classification of the slippery degree of the road in the mapping table may be changed according to the actual conditions.

Alternatively, after the slippery parameter of the present driving road is calculated by the above formula, it is needed to control the autonomous driving mode according to the slippery parameter.

Alternatively, controlling the autonomous driving mode may include, but not limited to, the followings.

(1) When the vehicle is in the autonomous driving mode at present, a first prompt message is displayed, wherein the first prompt message is used for prompting that the present driving road on which the vehicle drives is slippery.

By taking that the above slippery parameter is 8 for example, because the slippery parameter is comparatively high, the present driving road is severely slippery, and the first prompt message is displayed. Alternatively, the above first prompt message may be, but not limited to, a text message, an image message, an audio message, a scintillation message, and so on. The above image message may be a pattern message or a video message or a shadow message.

Figure 3:
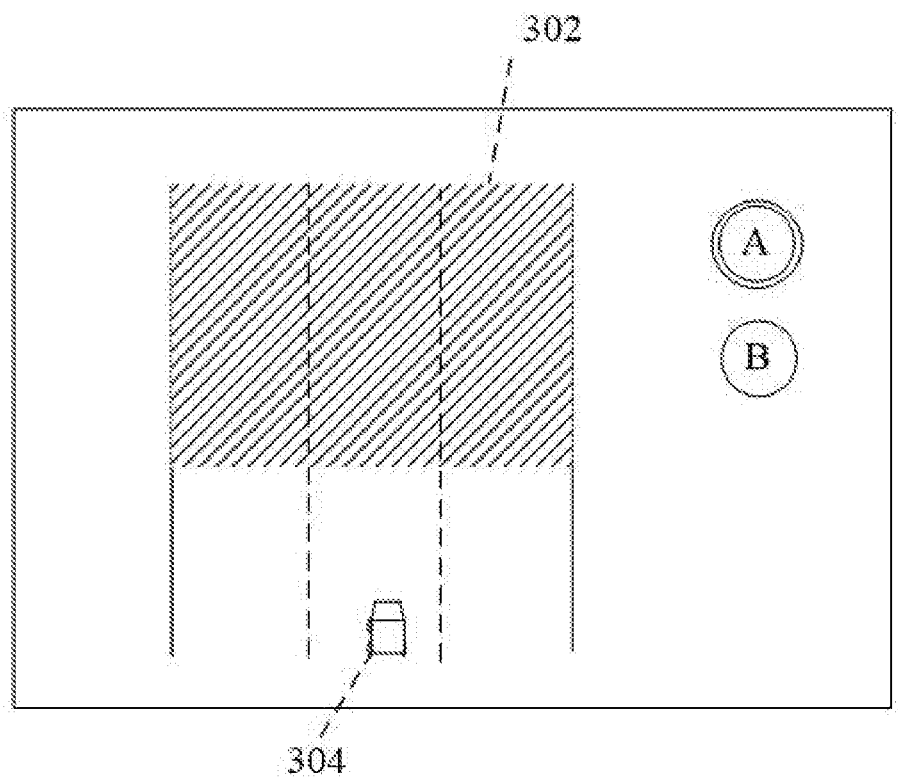
FIG. 3 is a schematic diagram of an alternative method for controlling a vehicle in accordance with another aspect of the disclosure.

FIG. 3 is an alternative prompt interface displaying the prompt message. A button A is displayed on the prompt interface. If the button A is pressed, the vehicle is in the autonomous driving mode. If the button B is pressed, the vehicle is in the manual driving mode. 304 is the location of the moving car on the prompt interface. 302 is the first prompt message. A shadow is used for indicating that the slippery degree of the present driving road is severe.

(2) When the vehicle is in the autonomous driving mode at present, a second prompt message is displayed, wherein the second prompt message is used for prompting (the user) for switching the driving mode of the vehicle from the autonomous driving mode to the manual driving mode.

By taking that the slippery parameter is 8 for example again, because the above slippery parameter is comparatively high, the present driving road is severely slippery, and the second prompt message is displayed. Alternatively, the above second prompt message may be, but not limited to, the text message, the image message, the audio message, the scintillation message, and so on. The above image message may be the pattern message or the video message.

Figure 4:
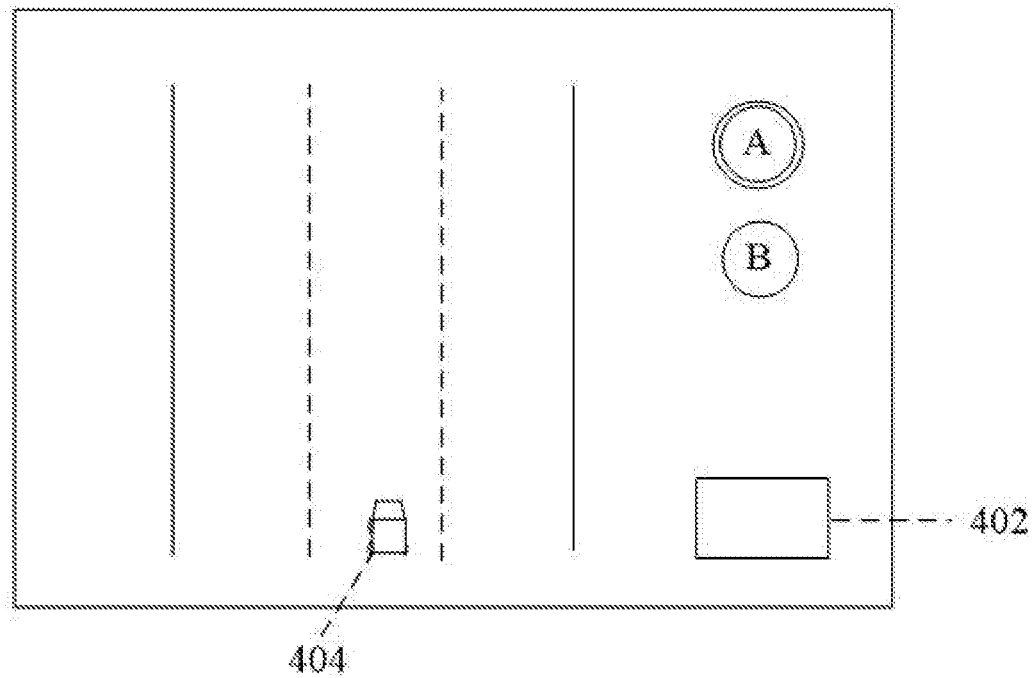
FIG. 4 is a schematic diagram of another alternative method for controlling a vehicle in accordance with another aspect of the disclosure.

FIG. 4 is an alternative prompt interface displaying the second prompt message. As shown in FIG. 4, 404 is the location of the car on the prompt interface. If the button A in FIG. 4 is pressed, the vehicle is in the autonomous driving mode, then 402 may make a sound for prompting the user that it is needed to switch the driving mode, and the user may switch the driving mode by pressing the button B.

(3) When the vehicle is in the autonomous driving mode at present, a third prompt message is displayed, wherein the third prompt message is used for prompting that the vehicle is not allowed to be switched to the autonomous driving mode due to the weather.

By taking that the slippery parameter is 8 for example again, because the above slippery parameter is comparatively high, the present driving road is severely slippery, and the vehicle is in the manual driving mode at present, then the third prompt message is displayed. Alternatively, the third prompt message may be, but not limited to, the text message, the image message, the audio message, the scintillation message, and so on. The above scintillation message may be showed, but not limited, in the form of light. When the light is on, the button A may be pressed; when the light is off, the button A may not be pressed.

Figure 5:
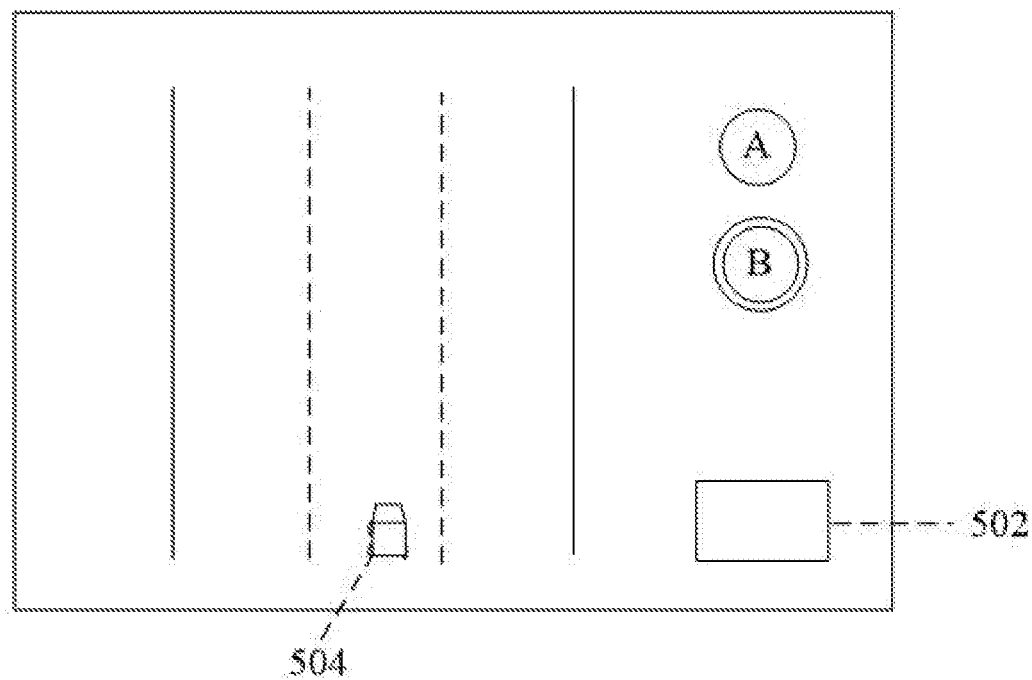
FIG. 5 is a schematic diagram of yet another alternative method for controlling a vehicle in accordance with another aspect of the disclosure.

FIG. 3 is an alternative prompt interface displaying the third prompt message. As shown in FIG. 5, the reference number 504 is the location of the car on the prompt interface. If the button B is pressed, the vehicle is in the manual driving mode at present. The reference number 502 is an indicator light. When the indicator light is off, the vehicle may be not allowed to be switched to the autonomous driving mode at present. At this point, even the button A is pressed, the vehicle cannot be switched to the autonomous driving mode, and a message indicating that the vehicle is not allowed to be switched to the autonomous driving mode is displayed.

Alternatively, controlling the autonomous driving mode may further include, but not limited to, that:

when the slippery parameter is greater than a first threshold, the autonomous driving mode of the vehicle is controlled, wherein that the slippery parameter is greater than the first threshold is used for indicating that the present driving road is slippery, and the present driving road is in the greatest slippery degree.

Alternatively, the above first threshold may be, but not limited to, a preset critical value. When the slippery parameter is greater than the first threshold, the present road is too slippery, a risk possibility is comparatively high, and it is needed to control the autonomous driving mode immediately, for example, switching to the manual driving mode or slowly parking to a safe place.

Alternatively, controlling the autonomous driving mode of the vehicle may further include, but not limited to, the followings.

(1) When the vehicle is in the autonomous driving mode at present, an autonomous driving speed of the vehicle in the autonomous driving mode is reduced.

Alternatively, the above autonomous driving speed may be determined, but not limited to, according to the slippery parameter. The slippery parameter is greater, the corresponding autonomous driving speed is lower.

For example, an illustration is given in combination with a situation where the above slippery parameter is between 0 and 10. By taking that the slippery parameter is 5 for example, a slippery condition of the present driving road corresponding to the slippery parameter is moderately slippery. In above situation, it is needed to adjust the driving speed of the present autonomous driving mode, for example, reducing the driving speed to ensure the security. For example, the autonomous driving speed when the slippery parameter is 4 may be higher than the autonomous driving speed when the slippery parameter is 5.

(2) When the vehicle is in the autonomous driving mode, the maximum autonomous driving speed of the vehicle allowable in the autonomous driving mode is reduced.

For example, an illustration is given in combination with a situation where the above slippery parameter is between 0 and 10. By taking that the slippery parameter is 5 for example, the slippery condition of the present driving road corresponding to the slippery parameter is moderately slippery. In above situation, it is needed to adjust the maximum driving speed allowable in the present autonomous driving mode, for example, reducing the maximum driving speed allowable in the present autonomous driving mode. The greater the slippery parameter is, the lower the maximum driving speed allowable is.

Alternatively, the above maximum driving speed may be determined, but not limited to, according to bend curvature of the present driving road.

For example, in the case that the slippery parameter is kept constant, the bend is curvier, the maximum driving speed is lower; the bend is smoother, the maximum driving speed is higher.

Alternatively, controlling the autonomous driving mode of the vehicle may further include, but not limited to, that: when the vehicle is in the autonomous driving mode at present, and the slippery parameter also indicates that there is waterlogging on a present lane, where the vehicle is, of the present driving road, the vehicle is controlled to switch, in the autonomous driving mode, from the present lane to a target lane without waterlogging of the present driving road.

Figure 6:
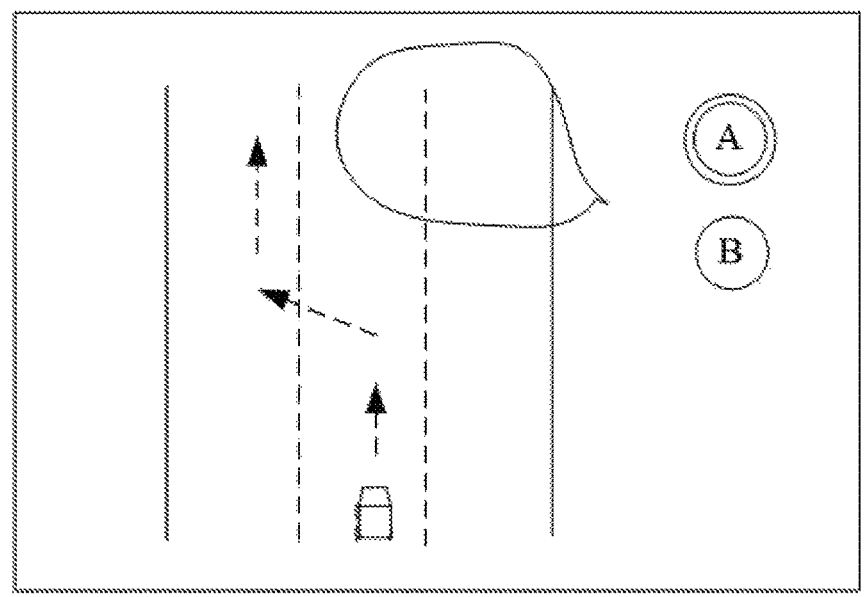
FIG. 6 is a schematic diagram of yet another alternative method for controlling a vehicle in accordance with another aspect of the disclosure.
Figure 7:
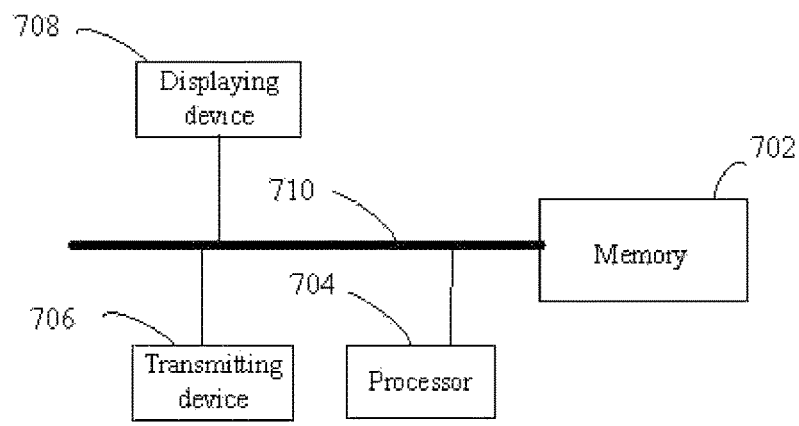
FIG. 7 is a structure diagram of an alternative device for controlling a vehicle in accordance with an aspect of the disclosure.
Figure 8:
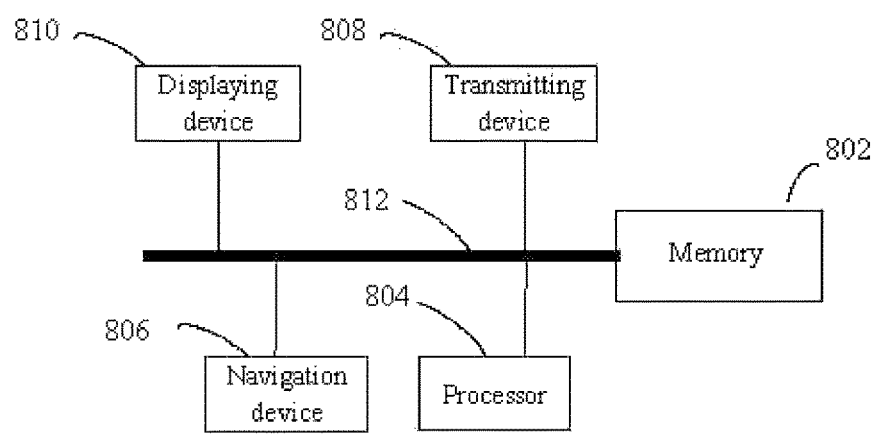
FIG. 8 is a structure diagram of an alternative autonomous driving vehicle in accordance with an aspect of the disclosure.

For example, as shown in FIG. 6, the present driving road in FIG. 6 includes three lanes, and there is waterlogging on the present lane. In this case, it is needed to control the vehicle to automatically switch to the target lane without waterlogging, thereby ensuring the security of autonomous driving.

Alternatively, in the process of switching the lane, it is also needed to detect road condition information of the target lane. The road condition information of the target lane may be detected via, but not limited to, a sensor and a camera in the vehicle to acquire target road condition information.

Alternatively, the above sensor and camera may be installed in or out of the vehicle. For example, the sensor is installed around the car, and the camera is installed on top of the car.

In the above embodiments, by including the historical data into the self-driving car system, it will enhance the prediction and detection of environment conditions thus enables safer and smoother autonomous control of the vehicle.

It is to be noted that for the sake of simple description, each aforementioned embodiment of the method is described as a series of action combinations. But those skilled in the art should know that the present invention is not limited to a sequence of the described actions, it is because some steps may be performed in other sequences or simultaneously according to the present invention. Besides, those skilled in the art should also know that all the embodiments described in the specification are preferred embodiments, and the actions and modules involved may not be necessary.

Through the above description of implementations, those skilled in the art may clearly know that the method according to the above implementations may be implemented by means of software plus a necessary common hardware platform, certainly by means of hardware; but in many cases, the former is the better implementation mode. Based on this understanding, the technical solutions of the present invention substantially or the part making a contribution to the prior art may be embodied in the form of software product; the computer software product is stored in a storage medium (e.g. an ROM/RAM, a magnetic disk, and a compact disc) and includes a number of instructions to make a terminal device (which may be a mobile phone, a computer, a server or a network device, etc.) perform the method in each embodiment of the present invention.

According to another aspect of the present invention, a device for controlling a vehicle is also provided. Alternatively, the device for controlling a vehicle may be installed in, but not limited to, the car.

Alternatively, the above device for controlling a vehicle includes:

(1) a processor 704, which is configured to execute computer executable instructions; and (2) a memory 702, which is configured to store the computer executable instructions that, when executed by the processor, cause the device to perform the following steps:

the historical weather information of the present driving road planned for the vehicle is acquired;

the slippery parameter of the present driving road is determined according to the historical weather information; and when the slippery parameter indicates that the present driving road is slippery, the autonomous driving mode of the vehicle is controlled.

Based on above alternative method, the car with the autonomous driving function can be controlled safely, since the historical weather information of a present driving road is considered.

Alternatively, the historical weather information may, but be not limited to, comprise at least one of the followings: a road type of the present driving road, a lane type of a lane where the vehicle is of the present driving road, water accumulation volume on the present driving road formed since the last rainfall on the present driving road, and a time interval between the time of the last rainfall on the present driving road and the present time.

Alternatively, the historical weather information may, but be not limited to, comprise at least one of the followings: a road type of the present driving road, a lane type of a lane where the vehicle is of the present driving road, snow accumulation volume on the present driving road formed since the last snowfall on the present driving road, and the time interval between the time of the last snowfall on the present driving road and the present time.

Alternatively, controlling the autonomous driving mode of the vehicle may include, but not limited to, that: when the vehicle is in the autonomous driving mode at present, the first prompt message is displayed, wherein the first prompt message is used for prompting that the present driving road on which the vehicle drives at present is slippery; or when the vehicle is in the autonomous driving mode at present, the second prompt message is displayed, wherein the second prompt message is used for prompting (the user) for switching the driving mode of the vehicle from the autonomous driving mode to the manual driving mode; or when the vehicle is in the autonomous driving mode at present, the third prompt message is displayed, wherein the third prompt message is used for prompting that the vehicle cannot be switched to the autonomous driving mode due to the weather.

Alternatively, controlling the autonomous driving mode of the vehicle may further include that: when the vehicle is in the autonomous driving mode at present, the autonomous driving speed of the vehicle in the autonomous driving mode is reduced; or when the vehicle is in the autonomous driving mode, the maximum autonomous driving speed of the vehicle allowable in the autonomous driving mode is reduced.

For example, an illustration is given in combination with the situation where the above slippery parameter is between 0 and 10. By taking that the slippery parameter is 5 for example, the slippery condition of the present driving road corresponding to the slippery parameter is moderately slippery. In above situation, it is needed to adjust the driving speed of the present autonomous driving mode, for example, reducing the driving speed to ensure the security of driving the vehicle. For example, the autonomous driving speed when the slippery parameter is 4 may be higher than the autonomous driving speed when the slippery parameter is 5. Or by taking that the slippery parameter is 5 for example, the slippery condition of the present driving road corresponding to the slippery parameter is moderately slippery. In above situation, it is needed to adjust the maximum driving speed allowable in the present autonomous driving mode, for example, reducing the maximum driving speed allowable in the present autonomous driving mode. The slippery parameter is greater, the maximum driving speed allowed is lower.

Alternatively, reducing the maximum driving speed of the vehicle allowable in the autonomous driving mode may include, but not limited to, that: the maximum autonomous driving speed of the vehicle allowable in the autonomous driving mode is reduced by a target maximum speed, wherein the target maximum speed corresponds to the slippery parameter and the bend curvature of the present driving road.

For example, in the case that the slippery parameter is kept constant, the bend is curvier, the maximum driving speed is lower; the bend is smoother, the maximum driving speed is higher.

Alternatively, controlling the autonomous driving mode of the vehicle may further include that: when the vehicle is in the autonomous driving mode at present, and the slippery parameter also indicates that there is waterlogging on the present lane, where the vehicle is, of the present driving road, the vehicle is controlled to switch, in the autonomous driving mode, from the present lane to the target lane without waterlogging of the present driving road.

For example, as shown in FIG. 6, the present driving road in FIG. 6 includes three lanes, and there is waterlogging on the present lane. In this case, it is needed to control the vehicle to automatically switch to the target lane without waterlogging, thereby ensuring the security of autonomous driving.

Alternatively, in the process of switching the lane, it is also needed to detect the road condition information of the target lane. The road condition information of the target lane may be detected via, but not limited to, the sensor and the camera in the vehicle to acquire the target road condition information.

Alternatively, the above sensor and camera may be installed in or out of the vehicle. For example, the sensor is installed around the car, and the camera is installed on top of the car.

Alternatively, the device for controlling a vehicle may further include, but not limited to:

a transmitting device 706, which is configured to receive or send data via a network;

a displaying device 708, which is configured to display the first prompt message, the second prompt message and the third prompt message;

a connecting bus 710, which is configured to connect various modular components in the above device for controlling a vehicle.

Through the embodiment, the car with the autonomous driving function can be controlled safely, since the historical weather information of a present driving road is considered.

According to yet another aspect of the present invention, an autonomous driving vehicle is also provided, which includes:

(1) a navigation device 806, which is configured to plan the present driving road for the vehicle;

(2) a processor 804, which is configured to execute the computer executable instructions;

(3) a memory 802, which is configured to store the computer executable instructions that, when executed by the processor, cause the vehicle to perform the following steps:

the historical weather information of the present driving road planned for the vehicle is acquired;

the slippery parameter of the present driving road is determined according to the historical weather information; and when the slippery parameter indicates that the present driving road is slippery, the autonomous driving mode of the vehicle is controlled.

Alternatively, the autonomous driving vehicle may, but not limited to, be controlled safely by acquiring the historical weather information of the present driving road planned for the vehicle, determining the slippery parameter of the present driving road according to the historical weather information, and controlling the autonomous driving mode of the vehicle according to the slippery parameter.

Alternatively, the historical weather information may, but be not limited to, comprise at least one of the followings: a road type of the present driving road, a lane type of a lane where the vehicle is of the present driving road, water accumulation volume on the present driving road formed since the last rainfall on the present driving road, and a time interval between the time of the last rainfall on the present driving road and the present time.

Alternatively, the historical weather information may, but be not limited to, comprise at least one of the followings: a road type of the present driving road, a lane type of a lane where the vehicle is of the present driving road, snow accumulation volume on the present driving road formed since the last snowfall on the present driving road, and the time interval between the time of the last snowfall on the present driving road and the present time.

Alternatively, controlling the autonomous driving mode of the vehicle may include, but not limited to, that: when the vehicle is in the autonomous driving mode at present, the first prompt message is displayed, wherein the first prompt message is used for prompting that the present driving road on which the vehicle drives at present is slippery; or when the vehicle is in the autonomous driving mode at present, the second prompt message is displayed, wherein the second prompt message is used for prompting (the user) for switching the driving mode of the vehicle from the autonomous driving mode to the manual driving mode; or when the vehicle is in the autonomous driving mode at present, the third prompt message is displayed, wherein the third prompt message is used for prompting that the vehicle cannot be switched to the autonomous driving mode due to the weather.

Alternatively, controlling the autonomous driving mode of the vehicle may further include that: when the vehicle is in the autonomous driving mode at present, the autonomous driving speed of the vehicle in the autonomous driving mode is reduced; or when the vehicle is in the autonomous driving mode, the maximum autonomous driving speed of the vehicle allowable in the autonomous driving mode is reduced.

For example, an illustration is given in combination with the situation where the above slippery parameter is between 0 and 10. By taking that the slippery parameter is 5 for example, the slippery condition of the present driving road corresponding to the slippery parameter is moderately slippery. In above situation, it is needed to adjust the driving speed of the present autonomous driving mode, for example, reducing the driving speed to ensure the security of driving the vehicle. For example, the autonomous driving speed when the slippery parameter is 4 may be higher than the autonomous driving speed when the slippery parameter is 5. Or by taking that the slippery parameter is 5 for example, the slippery condition of the present driving road corresponding to the slippery parameter is moderately slippery. In above situation, it is needed to adjust the maximum driving speed allowable in the present autonomous driving mode, for example, reducing the maximum driving speed allowable in the present autonomous driving mode. The slippery parameter is greater, the maximum driving speed allowed is lower.

Alternatively, reducing the maximum driving speed of the vehicle allowable in the autonomous driving mode may include, but not limited to, that: the maximum autonomous driving speed of the vehicle allowable in the autonomous driving mode is reduced by the target maximum speed, wherein the target maximum speed corresponds to the slippery parameter and the bend curvature of the present driving road.

For example, in the case that the slippery parameter is kept constant, the bend is curvier, the maximum driving speed is lower; the bend is smoother, the maximum driving speed is higher.

Alternatively, controlling the autonomous driving mode of the vehicle may further include that: when the vehicle is in the autonomous driving mode at present, and the slippery parameter also indicates that there is waterlogging on the present lane, where the vehicle is, of the present driving road, the vehicle is controlled to switch, in the autonomous driving mode, from the present lane to the target lane without waterlogging of the present driving road.

For example, as shown in FIG. 6, the present driving road in FIG. 6 includes three lanes, and there is waterlogging on the present lane. In this case, it is needed to control the vehicle to automatically switch to the target lane without waterlogging, thereby ensuring the security of autonomous driving.

Alternatively, in the process of switching the lane, it is also needed to detect the road condition information of the target lane. The road condition information of the target lane may be detected via, but not limited to, the sensor and the camera in the vehicle to acquire the target road condition information.

Alternatively, the above sensor and camera may be installed in or out of the vehicle. For example, the sensor is installed around the car, and the camera is installed on top of the car.

Alternatively, the device for controlling a vehicle may further include, but not limited to:

the transmitting device 808, which is configured to receive or send data via a network;

the displaying device 810, which is configured to display the first prompt message, the second prompt message and the third prompt message;

the connecting bus 812, which is configured to connect various modular components in the above device for controlling a vehicle.

Through the embodiment, by acquiring the historical weather information, and acquiring the slippery parameter of the present driving road through the autonomous driving vehicle according to the historical weather information, the autonomous driving mode may be controlled according to the slippery parameter, and the effect of controlling the autonomous driving mode according to the slippery condition of the road is achieved.

In the above embodiments, to better use the historical weather data, the autonomous drive system will need to detect current weather, location as well as the environment. The autonomous drive system can use a temperature sensor to get real time temperature. It may use a rain sensor to detect if there is rain, and how heavy the rain is and etc. It may also use a light sensor to detect if there is enough light for the system to function. It may use a map module (such as an HD map APP) to get location and the current road the car rides on. It may use perception module with supported sensors like camera, radar, LiDAR to detect road conditions.

The autonomous drive system may fusion the historic weather data, the current weather data, the location, and road conditions to decide if the autonomous system performs the different functions. For example, when the historical weather data shows that current time is snow season, and the temperature is below zero, the road is detected with white covering, the system might be able to check if there is ice on the road, and disengage the autonomous driving accordingly.

In the above embodiments, a neural network, which is specifically trained for rain, can be introduced to detect the accumulated water on the road. For example, a large number of videos, which associated the road under various weather conditions, are collected firstly, and then manually identify the areas of the accumulated water in the frames of the videos. A classification model is trained by using convolutional neural networks and calibration data, and then the model is deployed to the autonomous drive system, and the inference is made at a relatively low frequency. The result is used as a reference for whether or not the water is accumulated.

According to yet another aspect of the present invention, a storage medium is also provided, in which a computer program is stored; the computer program is configured to perform the steps in any above embodiment of the method when running.

Alternatively, in the embodiment, the storage medium may be configured to store the computer program for performing the following steps.

At S1, the historical weather information of the present, driving road planned for the vehicle is acquired.

At S2, the slippery parameter of the present driving road is determined according to the historical weather information.

At S3, when the slippery parameter indicates that the present driving road is slippery, the autonomous driving mode of the vehicle is controlled.

Alternatively, in the embodiment, those of ordinary skill in the art may understand that all or part of the steps of the method in the embodiments may be performed by hardware which is related to a terminal device and instructed by a program; the program may be stored in computer readable storage media. The storage media may include: a flash disk, an ROM, an RAM, a magnetic disk, or a compact disk.

Sequence numbers of the embodiments of the present invention are just for describing, instead of representing superiority-inferiority of the embodiments.

If the integrated units in the above embodiments are implemented by software function units, and the software function units are sold or used as independent products, they may also be stored in a computer readable storage medium. Based on this understanding, the technical solutions in the embodiments of the present invention substantially or the part making a contribution to the traditional art may be embodied in the form of software product; the computer software product is stored in the storage media and includes a number of instructions to make one or more than one computer device (which may be the personal computer, the server or the network device, etc.) perform all or part of the steps of the method in the embodiments.

In the above embodiments of the present invention, the descriptions of the embodiments focus on different aspects. A part which is not described in a certain embodiment in detail may refer to the related description of the other embodiments.

In the several embodiments provided in the application, it should be understood that a client disclosed may be realized in other ways. Herein, the embodiment of the device described above is only schematic; for example, the division of the units is only a division of logical functions, and there may be other dividing modes during the actual implementation, for example, multiple units or components may be combined or integrated to another system, or some features may be ignored or are not executed. In addition, coupling, direct coupling, or communication connection shown or discussed may be implemented through indirect coupling or communication connection of some interfaces, units or modules, and may be in an electrical form or other forms.

The units described as separate parts may be or may not be separate physically. The part shown as the unit may be or may not be a physical unit, that is to say, it may be in a place or distributed on multiple network units. It is possible to select, according to the actual needs, part or all of the units to achieve the objective of the solutions in the present invention.

Moreover, all the function units in the embodiments of the present invention may be integrated in a processing unit; or the units exist separately and physically; or two or more than two units are integrated in a unit. The integrated unit may be realized in form of hardware or in form of software function unit.

The above is only the preferred embodiments of the present invention; it should be indicated that, on the premise of not departing from the principles of the present invention, those of ordinary skill in the art may also make a number of improvements and supplements, and these improvements and supplements should fall within the scope of protection of the present invention.

What is claimed is:

1. A method for controlling a vehicle, comprising:
   acquiring historical weather information of a present driving road planned for a vehicle;
   determining a slippery parameter of the present driving road according to the historical weather information; and
   controlling an autonomous driving mode of the vehicle according to the slippery parameter;
   wherein determining the slippery parameter of the present driving road according to the historical weather information comprises: determining the slippery parameter by a following formula:

$D=k_0*Aw*e^{-k_1*delta\_t}$, where the D represents the slippery parameter, the $k_0$ is a predetermined constant, the Aw is water accumulation volume on the present driving road formed since the last rainfall on the present driving road, a value of the $k_1$ is related to a road type of the present driving road and a lane type of a lane where the vehicle is of the present driving road, and the delta_t is the time interval between the time of the last rainfall on the present driving road and the present time; or
   where the D represents the slippery parameter, the $k_0$ is the predetermined constant, the Aw is snow accumulation volume on the present driving road formed since the last snowfall on the present driving road, a value of the $k_1$ is related to a road type of the present driving road and a lane type of a lane where the vehicle is of the present driving road, and the delta_t is the time interval between the time of the last snowfall on the present driving road and the present time.

2. The method as claimed in claim 1, wherein controlling the autonomous driving mode of the vehicle according to the slippery parameter comprises:
   controlling the autonomous driving mode of the vehicle when the slippery parameter is greater than a first threshold, wherein the slippery parameter which is greater than the first threshold is configured to indicate that the present driving road is slippery, and the present driving road is in the greatest slippery degree.

3. The method as claimed in claim 2, wherein controlling the autonomous driving mode of the vehicle comprises:
   displaying a first prompt message when the vehicle is in the autonomous driving mode, wherein the first prompt message is configured to prompt that the present driving road on which the vehicle drives at present is slippery; or
   displaying a second prompt message when the vehicle is in the autonomous driving mode, wherein the second prompt message is configured to prompt for switching a driving mode of the vehicle from the autonomous driving mode to a manual driving mode; or
   displaying a third prompt message when the vehicle is in the manual driving mode, wherein the third prompt message is configured to prompt that the vehicle is not allowed to be switched to the autonomous driving mode due to the weather.

4. The method as claimed in claim 1, wherein controlling the autonomous driving mode of the vehicle comprises:
   reducing an autonomous driving speed of the vehicle in the autonomous driving mode when the vehicle is in the autonomous driving mode; or
   reducing the maximum autonomous driving speed of the vehicle allowable in the autonomous driving mode when the vehicle is in the autonomous driving mode.

5. The method as claimed in claim 4, wherein reducing the maximum autonomous driving speed of the vehicle allowable in the autonomous driving mode comprises:
   reducing the maximum autonomous driving speed of the vehicle allowable in the autonomous driving mode to be a target maximum speed, wherein the target maximum speed corresponds to the slippery parameter and bend curvature of the present driving road.

6. The method as claimed in claim 4, wherein controlling the autonomous driving mode of the vehicle when the slippery parameter indicates that the present driving road is slippery comprises:
   controlling the autonomous driving mode of the vehicle when the slippery parameter is greater than a second threshold and less than or equal to the first threshold, wherein the slippery parameter which is greater than the second threshold and less than or equal to the first threshold is configured to indicate that the present driving road is slippery, and the present driving road is in the second greatest slippery degree.

7. The method as claimed in claim 1, wherein controlling the autonomous driving mode of the vehicle comprises:
   controlling the vehicle in the autonomous driving mode to switch from a present lane of the present driving road to a target lane without waterlogging of the present driving road, when the vehicle is in the autonomous driving mode, and the slippery parameter indicates that there is waterlogging on the present lane where the vehicle is.

8. The method as claimed in claim 7, wherein controlling the vehicle in the autonomous driving mode to switch from a present lane of the present driving road to a target lane without waterlogging of the present driving road comprises:
   detecting road condition information of the target lane via a sensor and a camera in the vehicle to acquire target road condition information;
   controlling the vehicle in the autonomous driving mode to switch from the present lane to the target lane, when the target road condition information indicates that the vehicle is allowed to switch from the present lane to the target lane.

9. The method as claimed in claim 1, wherein acquiring the historical weather information of the present driving road planned for the vehicle comprises:
acquiring a road type of the present driving road, a lane type of a lane where the vehicle is of the present driving road, water accumulation volume on the present driving road formed since the last rainfall on the present driving road, and a time interval between the time of the last rainfall on the present driving road and the present time; or
acquiring a road type of the present driving road, a lane type of a lane where the vehicle is of the present driving road, snow accumulation volume on the present driving road formed since the last snowfall on the present driving road, and the time interval between the time of the last snowfall on the present driving road and the present time.

10. A device for controlling a vehicle, comprising:
a processor, configured to execute computer executable instructions;
a memory, storing the computer executable instructions that, when executed by the processor, cause the device to perform steps comprising:
acquiring historical weather information of a present driving road planned for a vehicle;
determining a slippery parameter of the present driving road according to the historical weather information; and
controlling an autonomous driving mode of the vehicle according to the slippery parameter;
wherein determining the slippery parameter by a following formula:

$$D=k_0 * Aw * e^{-k_1 * delta\_t},$$

where the D represents the slippery parameter, the $k_0$ is a predetermined constant, the Aw is water accumulation volume on the present driving road formed since the last rainfall on the present driving road, a value of the $k_1$ is related to a road type of the present driving road and a lane type of a lane where the vehicle is of the present driving road, and the delta_t is the time interval between the time of the last rainfall on the present driving road and the present time; or
where the D represents the slippery parameter, the $k_0$ is the predetermined constant, the Aw is snow accumulation volume on the present driving road formed since the last snowfall on the present driving road, a value of the $k_1$ is related to a road type of the present driving road and a lane type of a lane where the vehicle is of the present driving road, and the delta_t is the time interval between the time of the last snowfall on the present driving road and the present time.

11. The device as claimed in claim 10, wherein controlling the autonomous driving mode of the vehicle comprises:
displaying a first prompt message when the vehicle is in the autonomous driving mode, wherein the first prompt message is configured to prompt that the present driving road on which the vehicle drives at present is slippery; or
displaying a second prompt message when the vehicle is in the autonomous driving mode, wherein the second prompt message is configured to prompt for switching a driving mode of the vehicle from the autonomous driving mode to a manual driving mode; or
displaying a third prompt message when the vehicle is in the manual driving mode, wherein the third prompt message is configured to prompt that the vehicle is not allowed to be switched to the autonomous driving mode due to the weather.

12. The device as claimed in claim 10, wherein controlling the autonomous driving mode of the vehicle comprises:
reducing an autonomous driving speed of the vehicle in the autonomous driving mode when the vehicle is in the autonomous driving mode; or
reducing the maximum autonomous driving speed of the vehicle allowable in the autonomous driving mode when the vehicle is in the autonomous driving mode.

13. The device as claimed in claim 12, wherein reducing the maximum allowable autonomous driving speed of the vehicle in the autonomous driving mode comprises:
reducing the maximum autonomous driving speed of the vehicle allowable in the autonomous driving mode to be a target maximum speed, wherein the target maximum speed corresponds to the slippery parameter and bend curvature of the present driving road.

14. The device as claimed in claim 10, wherein controlling the autonomous driving mode of the vehicle comprises:
controlling the vehicle in the autonomous driving mode to switch from a present lane of the present driving road to a target lane without waterlogging of the present driving road, when the vehicle is in the autonomous driving mode, and the slippery parameter indicates that there is waterlogging on the present lane where the vehicle is.

15. An autonomous driving vehicle, comprising:
a navigation device, configured to plan a present driving road for the vehicle;
a processor, configured to execute computer executable instructions;
a memory, storing the computer executable instructions that, when executed by the processor, cause the vehicle to perform steps comprising:
acquiring historical weather information of the present driving road planned for the vehicle;
determining a slippery parameter of the present driving road according to the historical weather information; and
controlling an autonomous driving mode of the vehicle according to the slippery parameter;
wherein determining the slippery parameter by a following formula:

$$D=k_0 * Aw * e^{-k_1 * delta\_t},$$

where the D represents the slippery parameter, the $k_0$ is a predetermined constant, the Aw is water accumulation volume on the present driving road formed since the last rainfall on the present driving road, a value of the $k_1$ is related to a road type of the present driving road and a lane type of a lane where the vehicle is of the present driving road, and the delta_t is the time interval between the time of the last rainfall on the present driving road and the present time; or
where the D represents the slippery parameter, the $k_0$ is the predetermined constant, the Aw is snow accumulation volume on the present driving road formed since the last snowfall on the present driving road, a value of the $k_1$ is related to a road type of the present driving road and a lane type of a lane where the vehicle is of the present driving road, and the delta_t is the time interval between the time of the last snowfall on the present driving road and the present time.

16. The vehicle as claimed in claim 15, wherein controlling the autonomous driving mode of the vehicle comprises:

displaying a first prompt message when the vehicle is in the autonomous driving mode, wherein the first prompt message is configured to prompt that the present driving road on which the vehicle drives at present is slippery; or displaying a second prompt message when the vehicle is in the autonomous driving mode, wherein the second prompt message is configured to prompt for switching a driving mode of the vehicle from the autonomous driving mode to a manual driving mode; or displaying a third prompt message when the vehicle is in the manual driving mode, wherein the third prompt message is configured to prompt that the vehicle is not allowed to be switched to the autonomous driving mode due to the weather.

17. The vehicle as claimed in claim 15, wherein controlling the autonomous driving mode of the vehicle comprises:

reducing an autonomous driving speed of the vehicle in the autonomous driving mode when the vehicle is in the autonomous driving mode; or reducing the maximum autonomous driving speed of the vehicle allowable in the autonomous driving mode when the vehicle is in the autonomous driving mode.

18. The vehicle as claimed in claim 17, wherein reducing the maximum autonomous driving speed of the vehicle allowable in the autonomous driving mode comprises:

reducing the maximum autonomous driving speed of the vehicle allowable in the autonomous driving mode to be a target maximum speed, wherein the target maximum speed corresponds to the slippery parameter and bend curvature of the present driving road.

19. The vehicle as claimed in claim 15, wherein controlling the autonomous driving mode of the vehicle comprises:

controlling the vehicle in the autonomous driving mode to switch from a present lane of the present driving road to a target lane without waterlogging of the present driving road, when the vehicle is in the autonomous driving mode, and the slippery parameter indicates that there is waterlogging on the present lane where the vehicle is.

* * * * *